June 9, 1964 C. M. J. JAUCH 3,136,114

TELEPHONE CALL TIMER

Filed July 6, 1961 3 Sheets-Sheet 1

INVENTOR.
Christian M. J. Jauch,
BY H. H. Hulse
Attorney.

June 9, 1964 C. M. J. JAUCH 3,136,114

TELEPHONE CALL TIMER

Filed July 6, 1961 3 Sheets-Sheet 2

INVENTOR.
Christian M.J. Jauch,
BY
Attorney.

June 9, 1964 C. M. J. JAUCH 3,136,114

TELEPHONE CALL TIMER

Filed July 6, 1961 3 Sheets-Sheet 3

INVENTOR.
Christian M.J. Jauch,
BY
H. H. Hulse
Attorney.

United States Patent Office 3,136,114
Patented June 9, 1964

3,136,114
TELEPHONE CALL TIMER

Christian M. J. Jauch, Torrington, Conn., assignor to General Time Corporation, New York, N.Y., a corporation of Delaware Filed July 6, 1961, Ser. No. 122,157
7 Claims. (Cl. 58—21.14)

The present invention relates generally to timing devices and concerns, more particularly, a combined clock and interval timer.

It is the primary aim of the invention to provide a clock and short interval timer in one convenient unit that is particularly useful as a desk accessory for timing telephone conversations.

Another object of the invention is to provide a unit of the above character that permits accurate timing of relatively long periods as well as affording precise short interval timing.

A further object is to provide a unit as referred to above that is easy and convenient to use; with there being simple push-button controls and clear visual signals.

It is also an object to provide a unit as characterized above that is reliable in operation and which cannot be inadvertently jammed.

Moreover, it is an object to provide a unit of the above type which is quite compact while being inexpensive to manufacture.

Other objects and advantages of the invention will become apparent upon reading the following detailed description and upon reference to the drawings, in which.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
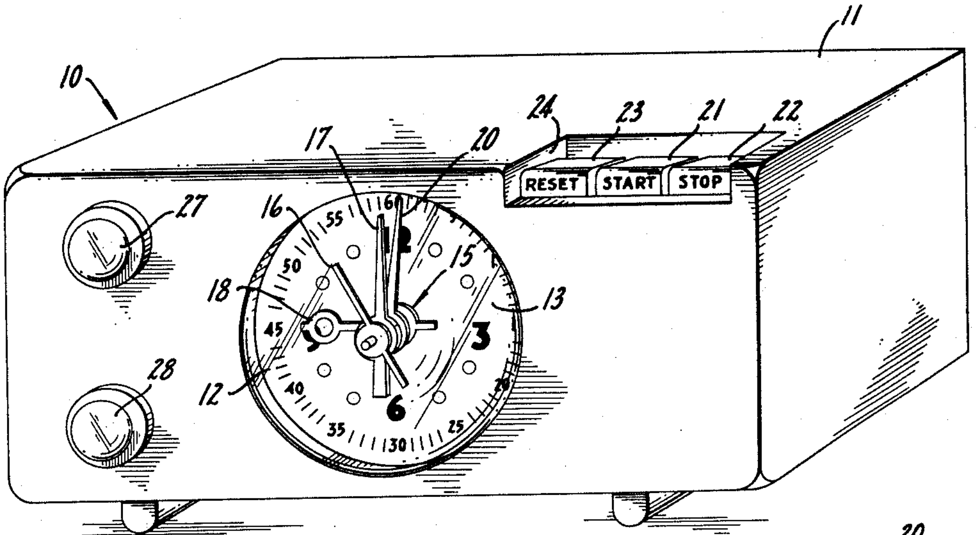
FIGURE 1 is a perspective of a timer constructed in accordance with the present invention.
Figures 3, 4:
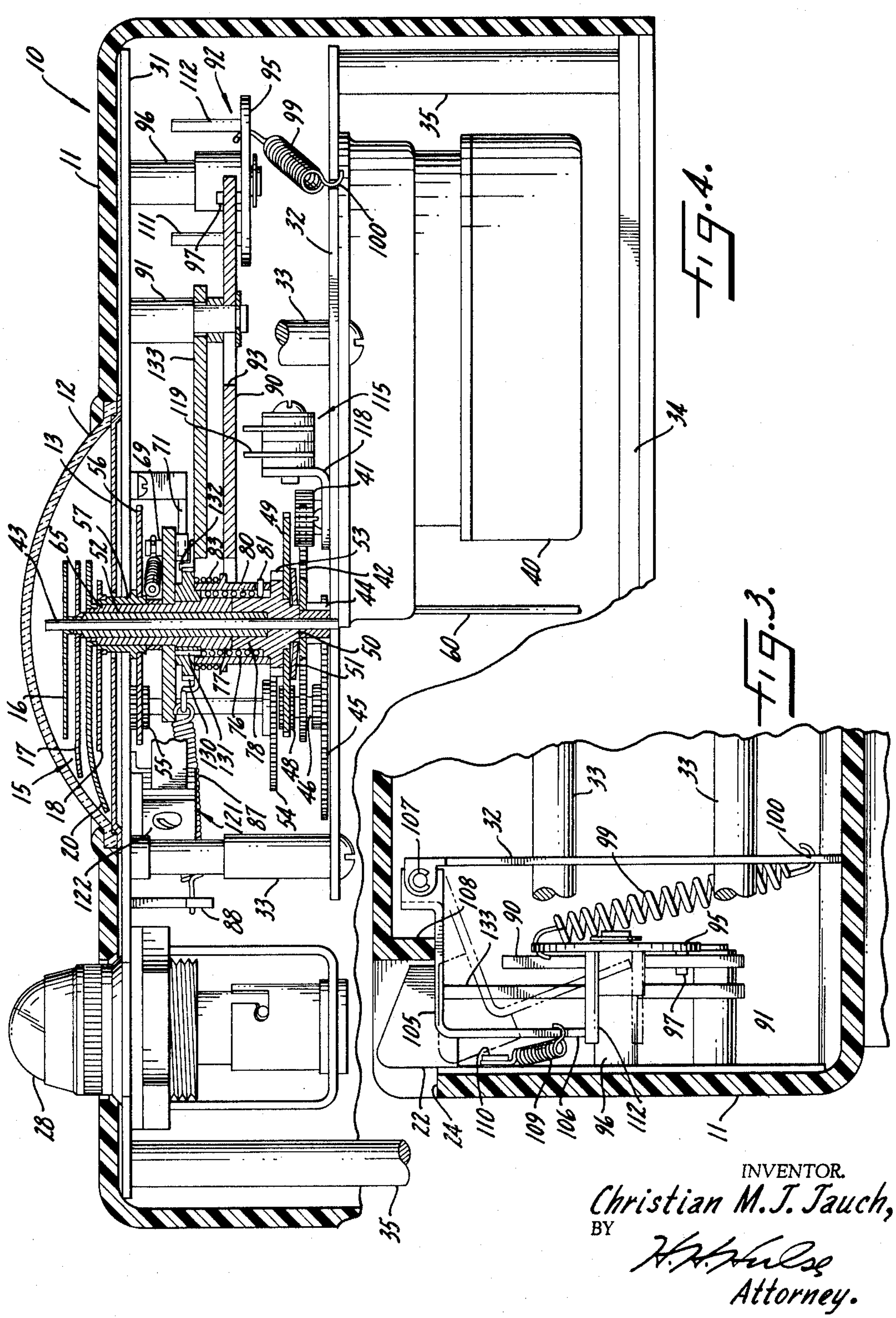
FIG. 3 is a fragmentary section taken approximately along the line 3—3 in FIG. 2.
FIG. 4 is a fragmentary section taken approximately along the line 4—4 in FIG. 2.

Turning first to FIG. 1, there is shown a combined clock and interval timer 10 constructed in accordance with the invention. The timer 10 includes a case or housing 11 styled for desk-top use and in which is mounted a dial lens 12 shielding a conventional twelve hour clock dial face 13 (see also FIG. 4). A conventional stack 15 of hands extends forwardly through the dial face 13 and includes a second hand 16, a minute hand 17 and an hour hand 18. The clock hands 16–18 function and cooperate with the dial face 13 in the usual manner.

The stack 15 also includes a fourth hand in the form of an elapsed time pointer 20 which is movable, from a starting point at the zero, twelve o'clock position, clockwise over the dial face 13 at the same rate as the minute hand 17. The pointer 20 thus indicates elapsed time directly in minutes on the minute scale of the dial 13.

To control the operation of the elapsed time pointer 20, a set of push buttons including a start button 21, a stop button 22 and a reset button 23 is mounted in an opening 24 in an upper corner of the housing 11. When the start button 21 is depressed, the pointer 20 begins its timed movement from the zero, twelve o'clock position. When the stop button 22 is depressed, movement of the pointer 20 is halted so that the pointer continues to directly indicate the elapsed time between operation of the respective start and stop buttons 21, 22. Depression of the reset button 23 returns the pointer 20 to its starting twelve o'clock position.

The timer 10 also includes a pair of visual signals including an On signal 27 and a warning signal 28. In the preferred construction these comprise green and red lamps, respectively. Since the exemplary timer 10 is primarily intended for timing telephone calls, the On signal lamp 27 is operated whenever the start button 21 is depressed and the warning signal 28 is operated approximately five seconds before the expiration of a three minute interval following depression of the start button 21.

It is therefore contemplated that the user of the timer 10 will depress the start button 21 as the telephone conversation begins. The green On signal 27 lights so as to indicate the timer is in operation. Shortly before the expiration of a three minute period, the red warning signal 28 lights so as to give the user an opportunity to terminate his conversation within a three minute interval. However, the timing pointer 20 continues to rotate beyond a three minute indication. When the conversation is terminated, the stop button 22 is depressed which arrests the pointer 20 at an exact indication of the number of minutes expired during the telephone conversation. Upon noting this figure, the user then presses the reset button 23 to return the pointer 20 to its zero starting position and extinguish the signals 27, 28 so that the timer is ready for another cycle of operation.

The housing 11 encloses a frame comprising a front frame plate 31 and a rear frame plate 32 held in rigid spaced relation by a plurality of posts 33. The housing 11 is closed by a back plate 34 (see FIG. 4) and a plurality of posts 35 space the frame plates 31, 32 from the housing back plate 34.

The clock hands 16, 17, 18 are driven by a timing train journalled between the frame plates 31 and 32 which is powered by a synchronous motor 40 secured to the rear of the back frame plate 32. The motor 40 rotates an output pinion 41 which is in mesh with a gear wheel 42 that is secured to a shaft 43 on which the second hand 16 is mounted. The gear ratio between the pinion 41 and the wheel 42 is selected in view of the synchronous speed of the motor 40 so that the shaft 43, and thus the second hand 16, rotate at a constant rate of one r.p.m.

To rotate the minute hand 17, a pinion 44 is secured to the shaft 43 meshing engagement with a gear wheel 45. The gear wheel 45 is secured to a sleeve 46 that is rotatably carried on a shaft 47 journalled between the frame plates 31, 32. A pinion 48 is also secured to the sleeve 46 in meshing engagement with a gear wheel 49 that is coupled a sleeve member 50 through a friction slip device 51. A sleeve 52, rotatably carried on the shaft 43, has its end fitted into and rigidly secured to the member 50 (see FIG. 4) so that the sleeve 52 and the member 50 rotate together. The minute hand 17 is secured to the outer end of the sleeve 52. The gear ratios of the pinion and wheel pairs 44, 45 and 48, 49 are selected so that the sleeve 52, and thus minute hand 17, rotates at a rate of of one r.p.h.

For rotating the hour hand 18, the member 50 has a gear portion 53 formed integrally therewith in mesh with a gear wheel 54 that is secured to the shaft 47. A pinion 55 is also secured to the shaft 47 and is in mesh with a gear wheel 56 that is secured to a collar 57 which is journalled in the front frame plate 31. The hour hand 18 is fixed on the forwardly extending portion of the collar 57. The gear ratios of the meshing pairs 53, 54 and 55, 56 are selected so that the hour hand 18 rotates at the usual rate of one revolution every twelve hours.

To set the clock hand 17, 18, a setting shaft 60 is journalled between the frame plates 31, 32 and carries a gear 61 which is in meshing engagement with the gear wheel 54. The shaft 60 extends rearwardly through the back plate 34 and supports a knob 62 so that the user of the timer 10, by grasping the knob 62, can rotate the gear 61 and thus set the positions of the minute and hour hands 17, 18. During such a setting operation, the friction device 51 permits the member 50 to rotate relative to the gear wheel 49 and thus the setting movement of the timing train is not transmitted back to the motor 40.

The interval pointer 20 is secured to a sleeve 65 positioned within the collar 57 and around the sleeve 52. The sleeve 65 carries a cam 66 and the cam, sleeve, and pointer assembly are biased to a starting position by a tensioned helical spring 67 which has one end anchored at 68 to the front frame plate 31 (see FIG. 2) and the other end secured at 69 to a pin 70 fixed in the cam 66. Under the force of the spring 67, the pin 70 is urged against a stop 71 that is secured to the front frame plate 31. With the pin 70 against the stop 71, the pointer 20 is held at its zero, twelve o'clock starting position.

In accordance with the invention, the interval pointer sleeve 65 is coupled for rotation to the timing train by a clutch 75 which drives the pointer 20 upon pressing the start button 21, interrupts rotation but locks the pointer sleeve 65 in the position reached upon pressing the stop button 22, and releases the pointer sleeve 65 so that it returns under the force of the spring 67 to its starting position when the reset button 23 is pressed. In the preferred embodiment, the clutch 75 includes a coil clutch spring 76 wound closly about adjacent, alined cylindrical shoulders 77 and 78 formed respectively on the driven sleeve 65 and the drive member 50. The clutch spring 76 is wound so that normal rotation of the member 50, counterclockwise in FIG 5, tends to tighten the coils of the spring about the shoulders 77, 78 and thus the spring defines a clockwise helix as seen from the angle of FIG. 5 (note also FIG. 4). The clutch 75 is engaged when the spring 76 is allowed to contract about the alined shoulders 77, 78 so as to establish a solid, nonslipping drive between the drive member 50 and the driven sleeve 65. The driving force tends to tighten the coils of the spring 76 about the adjacent shoulders 77, 78.

Figures 5, 6:
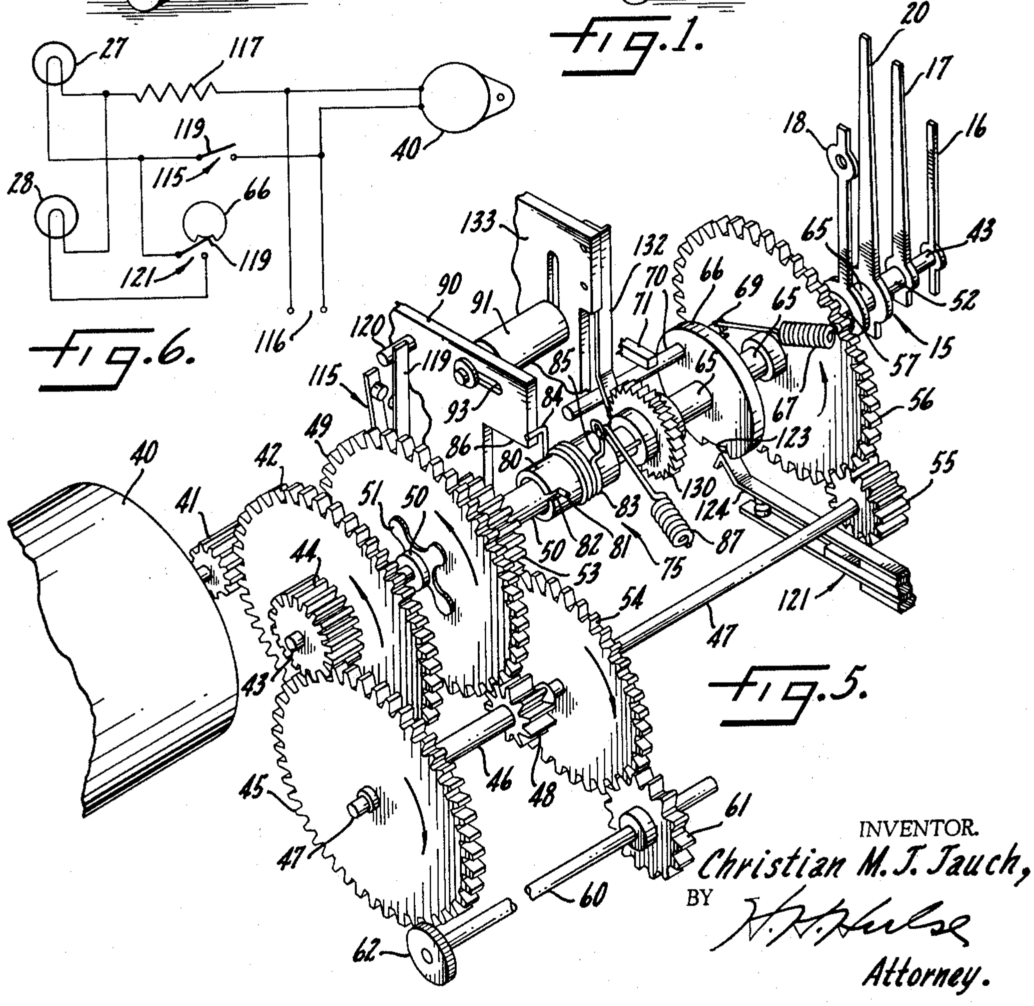
FIG. 5 is a somewhat diagrammatic perspective of a portion of the mechanism shown in FIGS. 2 and 4.
FIG. 6 is a schemtaic diagram of the wiring circuit utilized in the timer of FIG. 1.

To interrupt the drive through the clutch 75, the clutch includes a collar 80 loosely surrounding the coil clutch spring 76 with the end of the spring 76 that is over the drive shoulder 78 being secured to the collar by the spring end being bent into a radially extending tip 81 that is received in a slot 82 formed in the collar 80. A helical trip spring 83 is wound closely about the collar 80 so as to define a counterclockwise helix as seen in FIG. 5 and the ends of the trip spring are bent outwardly to form radially extending ends 84 and 85. A shiftable abutment 86 is arranged to be selectively moved into an out of contact with the end 84 of the trip spring. The trip spring 83 is resiliently held in place on the collar 80 by a normally unstressed, and hence stiff, helical spring 87 which is secured to the trip spring end 85 and anchored to a lug 88 on the front frame plate 31.

It can thus be seen that the collar 80 rotates with the coil clutch spring 76 because of the interengagement of the spring tip 81 with the slot 82 formed in the collar. With the abutment 86 spaced from the trip spring end 84, the drive member 50, driven sleeve 65, coil clutch spring 76 and collar 80 all rotate in a counterclockwise direction as seen in FIG. 5. The trip spring 83 offers no resistance to rotation of the collar 80 since friction between the collar 80 and the trip spring tends to unwind the spring and slight unwinding is permitted by the spacing between the abutment 86 and the spring end 84.

With the abutment 86 shifted into engagement with the trip spring end 84, the trip spring 83 cannot unwind and allow the collar 80 to freely rotate and, since rotation of the end 84 of the trip spring is arrested, the frictional force between the collar 80 and the coils of the trip spring tend to wind the trip spring even more tightly about the collar with the result that the collar is locked against rotation. Because of the very slight shifts of position involved, the collar is locked by the trip spring 83 virtually instantaneously when the abutment 86 engages the trip spring end 84. With the collar 80 unable to rotate, the tip 81 of the coil clutch spring 76 is also locked against rotation and hence the friction between the shoulder 78 and the surrounding coils of the spring 76 tend to unwrap those coils with the result that the drive between the member 50 and the coil clutch spring 76 is interrupted. Again, because of the very slight movements involved, the declutching action is virtually instantaneous. It will be noted, however, that at this time the coils of the clutch spring 76 remain in their normal snug engagement about the shoulder 77 so that the sleeve 65, and thus the pointer 20, is locked to the collar 80 against rotation.

For coupling the clutch controlling abutment 86 to the start and stop push buttons 21, 22, a shiftable operator plate 90, with which the abutment 86 is integrally formed, is slidable mounted on a plurality of posts 91 and connected to the push buttons by an over-centering device 92. The operator plate 90 is formed with slots 93 which fit over reduced portions of the posts 91 and define the sliding limit positions for the plate. The posts are secured to and extend rearwardly of the front frame plate 31.

The over-centering device 92 includes a disk 95 journalled on a post 96 that is secured to the front frame plate 31. The disk 95 carries a pin 97 which is received in a slot 98 formed in the operator plate 90 so that oscillation of the disk causes reciprocating movement of the plate between its limit positions. An over-centering spring 99 is tensioned between an anchoring point 100 on the rear frame plate 32 and a notch 101 in the disk 95 so that the spring 99 passes through the axis of the disk as the disk oscillates to shift the operator plate 90 between the latter's limit positions. That is, rotation of the disk 95 in a counterclockwise direction in FIG. 2 draws the operator plate 90 to the right and causes the spring 99 to move leftward through the axis of the post 96 on which the disk 95 is journalled. When the spring 99 is thus over-centered, its spring force draws the disk 95 in a counterclockwise direction until the ends of the slots 93 abut the post 91 with the operator in its left-hand limit position.

Each of the push buttons 21, 22 is mounted on an L-shaped base 105 having downwardly depending legs 106 and being journalled on a shaft 107 mounted in tabs formed on the rear frame plate 32. The bases 105 are urged upwardly against an abutment 108 formed as a portion of the housing 11 by a spring 109 whose midportion is anchored on a pin 110 secured to the front frame plate 31.

The depending legs 106 of the push button bases 105 overlie, respectively, pins 111 and 112 fixed to the disk 95. Thus, by depressing the push button 22 to the dashed line position shown in FIG. 3, the leg 106 engages and forces downwardly the pin 112 so as to oscillate the disk 95 through its over-centering position, with the result that the spring 99 snaps the disk 95, and thus the operator plate 90, into its alternate position. Conversely, depressing the push button 22 causes its associated leg 106 to engage the pin 111 so as to snap the disk 95 and the operator plate 90 to the right in FIG. 2.

Figure 2:
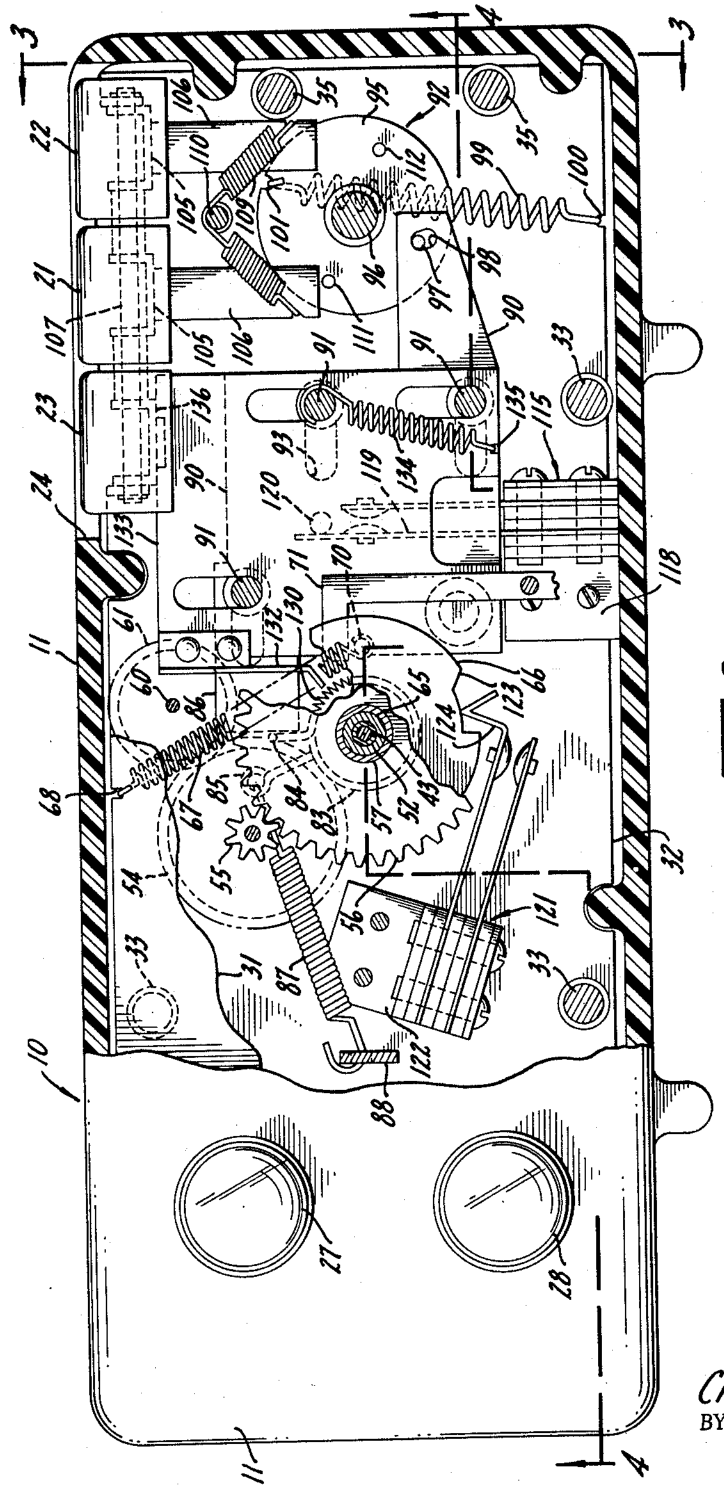
FIG. 2 is an enlarged front elevation, in partial section, of the timer shown in FIG. 1.

With the operator plate 90 shifted to the left to the position illustrated in FIG. 2, the Off position, the abutment 86 engages the end 84 of the trip spring 83 so as to lock the collar 80 against rotation and interrupt drive from the member 50 to the pointer sleeve 65. By depressing the start push button 21, the disk 95 is oscillated in a counterclockwise direction as seen in FIG. 2 so as to pull the operator plate 90 to its right-hand limit position, the On position, wherein the abutment 86 is spaced from the end 84 of the trip spring 83, thus engaging the clutch 75 so that the sleeve 65 and the pointer 20 are driven in unison with the member 50. Depression of the stop push button 22 oscillates the disk 95 in a clockwise direction as seen in FIG. 2 so as to return the operator plate 90 to its illustrated Off position wherein the abutment 86 engages the end 84 of the trip spring to disengage the clutch 75.

For operating the On signal 27 when the start button 21 is depressed, a switch 115 is electrically connected between a current source 116 and the On signal lamp 27 (see FIG. 6). The exemplary circuit also includes a load limiting resistor 117. The switch 115 is physically mounted on a bracket 118 secured to the rear frame plate 32, and a movable contact 119 of the switch is positioned in the path of a pin 120 mounted on the operator plate 90. With the operator plate in its left-hand Off position as shown in FIG. 2, the switch 115 is held open.When the start push button 21 is depressed to shift the operator plate 90 to the right in FIG. 2, to the left in FIG. 5, the switch 115 is closed so as to energize and thus operate the On signal 27.

For operating the warning signal 28 at a selected time, in this case shortly before the pointer 20 indicates the expiration of three minutes, the cam 66 is associated with a switch 121 which is electrically connected between the switch 119 and the warning lamp 28 (see FIG. 6) and is physically mounted on a bracket 122 fastened to the front frame plate 31 (see FIG. 2). The cam 66 is provided with a rise portion 123 which, upon the expiration of the desired interval, engages a movable contact 124 forming part of the switch 121 so as to close the switch 121 and energize the warning signal 28. As will be readily apparent, the cam rise 123 can be formed at any desirable location about the periphery of the cam 66 and, in the illustrated embodiment, the rise portion 123 is positioned to close the switch 121 shortly before the pointer indicates the expiration of a three minute period.

It will be apparent that when the stop button 22 is depressed to return the operator plate 90 to its Off position, the switch 115 is opened to deenergize both the On signal 27 and the warning signal 28 even though the switch 121 remains closed.

To reset the pointer sleeve 65 upon depression of the reset button 23, a ratchet wheel 130 is rotatably mounted on the sleeve 65 adjacent the collar 80, and the end of the coil clutch spring is secured to the ratchet wheel by the spring end being bent into an axially disposed tip 131 which is received in a hole in the ratchet wheel. Cooperating with the ratchet wheel 130 is a pawl 132 which is mounted on a shiftable carrier 133 slidably mounted on the posts 91. A tensioned helical spring 134 is anchored to one of the posts 91 and secured in a notch 135 in the carrier 133 so that the carrier is urged upwardly to a normal rest position with the pawl 132 out of engagement with the ratchet wheel 130.

The push button 23 is mounted on a base 136 that is pivoted on the push button supporting shaft 107 and which overlies the upper edge of the carrier 133. When depressed, the button 22 acts as a simple lever to slide the carrier 133 downwardly on the posts 91 against the bias of the spring 134 so that the pawl 132 engages and rotates the ratchet wheel 130 in a clockwise direction as seen in FIG. 2 (counterclockwise as seen in FIG. 5). This slight rotation of the ratchet wheel swings the clutch spring tip 131 so as to unwind those coils of the clutch spring surrounding the shoulder 77. This releases the force locking the pointer sleeve 65 in position and the spring 67 is thus able to rotate the cam 66, the sleeve 65 and the pointer 20, back to their starting positions with the pin 70 abutting the stop 71 and the pointer 20 in its zero, twelve o'clock position.

Although the warning signal 28 is operated approximately three minutes after the start button is depressed in the preferred construction, it will be understood that the interval timer continues to function beyond this time limit and the pointer 20 continues to sweep across the dial 13 and measure the interval being recorded. To prevent jamming in the event that the stop button 22 is not depressed, the pin 70 on the cam 66 projects sufficiently far to engage the end 85 of the trip spring 83 when the pointer 20 reaches approximately the forty minute mark on the dial 13. Continued movement of the cam 66, counterclockwise in FIG. 5 and clockwise in FIG. 2, swings the trip spring end 85 against the restoring bias of the spring 87 so that the trip spring ends 84, 85 are sandwiched, respectively, between the abutment 86 and the cam pin 70. This tightens the trip spring 83 about the collar 80 so as to lock the collar against rotation and thus interrupt the drive through the coil clutch spring 76 in the manner described above.

In other words, at the expiration of approximately a forty minute interval following depression of the start button 21, the pin 70 advances into contact with the trip spring end 85 with the result that the trip spring grips the collar 80 and interrupts the drive between the member 50 and the pointer sleeve 65. Thus, the interval timing operation is automatically halted at approximately a forty minute indication even though the stop button 22 is not depressed. This provides an adequate interval timing range for most telephone conversations and provides a positive safeguard against jamming should the timer be left unattended once placed in operation.

To review briefly the operation of the timer 10, the clock hands 16–18 function normally to give the user a conventional reading of the hour. The setting knob 62 permits the hands 17, 18 to be properly set, and the synchronous motor 40 insures timing accuracy.

When a desired interval is to be timed, as for example a telephone call, the start button 21 is depressed at the beginning of the interval. This shifts the operator plate 90 away from the trip spring end 84 and closes the switch 115. Closing of the switch 115 operates the On signal 27 and shifting of the abutment 86 from the trip spring 83 allows the collar 80 to rotate freely with the coil clutch spring 76, and this spring, wound snugly about the alined shoulders 77, 78 transmits a driving force from the member 50 to the pointer sleeve 65 that results in the pointer 20 moving at the same rate as the minute hand 17.

Shortly before the expiration of a three minute period, the cam 66, rotating with the sleeve 65, operates the switch 121 so that the warning light 28 is energized. However, the timing operation continues until the stop button 22 is depressed. This swings the over-centering device 92 to its alternate position and shifts the operator plate 90 to its Off position as illustrated in FIG. 2. The abutment 86 reengages the end 84 of the trip spring 83 so that the collar 80 is gripped and rotation of the tip 81 of the clutch coil spring is prevented. The driving force of the member 50 thus simply unwinds the clutch coil spring coils surrounding the shoulder 78 and the drive to the pointer sleeve 65 is interrupted. However, the clutch coil spring 76 continues to grip the shoulder 77 on the sleeve 65 so that the pointer 20 is held in the position reached when the stop button 22 is depressed.

Having noted the elapsed interval, the user of the timer 10 depresses the reset button 23 so that the pawl 132 swings the ratchet wheel 130, and thus the tip 131 of the clutch coil spring 76, to slightly unwind the coils of the clutch spring from the shoulder 77. This frees the sleeve 65, so that the spring 67 can rotate the sleeve, the cam 66 and the pointer 20 back to their starting positions.

Should the stop or reset buttons 21, 23 not be depressed while the interval timer is functioning, the pin 70 moves into engagement with the end 85 of the trip spring 83 at the expiration of approximately a forty minute interval so as to lock the collar 80 against rotation and interrupt the drive to the pointer sleeve 65.

It will be readily apparent that the timer 10 is easy and convenient to use since simple push-button controls and clear visual signals are provided. Those familiar with this art will also appreciate that the disclosed timer is very compact and economical to manufacture. The timer is also reliable in operation and not subject to jamming or other malfunction, and hence it is well suited for commercial use.

I claim as my invention:

1. An interval timer comprising, in combination, a frame, a drive element journalled in said frame and coupled to a timing train for rotation in one direction, a rotatable driven element journalled in said frame in alinement with said drive element and being biased to a starting position, a disengageable clutch coupling said drive and driven elements, an On signal, an operator shiftably mounted on said frame for movement between On and Off positions, means for disengaging said clutch and locking said driven element against rotation when said operator is in Off position and engaging the clutch and operating said On signal when the operator is in On position, an elapsed time indicator coupled for movement with said driven element, a warning signal, means coupled to said indicator for operating said warning signal when the indicator shows the expiration of a selected interval, a clutch releasing member mounted on said frame for movement between active and inactive positions, means coupling said member and said clutch for releasing said driven element when said member is in said active position so that the driven element returns under the force of said bias to said starting position.

2. An interval timer comprising, in combination, a frame, a drive element journalled in said frame and coupled to a timing train for rotation in one direction, a rotatable driven element journalled in said frame and biased to a starting position, a disengageable clutch coupling said drive and driven elements, an operator shiftably mounted on said frame for movement between On and Off positions, means for disengaging said clutch and locking said driven element against rotation when said operator is in Off position and engaging the clutch when the operator is in On position, an elapsed time indicator coupled for movement with said driven element, a clutch releasing member mounted on said frame for movement between active and inactive positions, means coupling said member and said clutch for releasing said driven element when said member is in said active position, an over-centering device, a pair of push buttons selectively engageable with said device for tripping said device into one or the other of its positions, said device being coupled to said operator so as to move the operator between On and Off positions as the device is over-centered by said push buttons, and a third push button coupled to said clutch releasing member so that operation of the third push button returns said driven element to said starting position.

3. An interval timer comprising, in combination, a drive element having a cylindrical shoulder and being coupled to a timing train for rotation in one direction, a rotatable driven element having a cylindrical shoulder adjacent and axially alined with the shoulder of said drive element, a projection mounted for rotation with said drive element, a biasing spring coupled to said driven element for urging the driven element in the direction opposite said one direction so as to bring said projection against a stop to establish a starting position, a coil clutch spring wound closely about said shoulders so that rotation of said drive element in said one direction tends to tighten said spring and drive said driven element from said starting position, a collar loosely fitted on said clutch spring, the end of said clutch spring over said drive element shoulder being secured to said collar, a helical trip spring wound closely about said collar and having radially extending ends, an operator shiftably mounted for movement between On and Off position, an abutment on said operator engageable, when the operator is in Off position, with one end of said trip spring so as to prevent unwinding of the trip spring and rotation of said collar in said one direction, said abutment being spaced from said trip spring end when the operator is in On position so that said collar is free to rotate with said clutch spring as said drive shaft drives said driven element, an elapsed time pointer mounted for rotation with said driven element, a ratchet wheel rotatably mounted adjacent said collar with the end of said clutch spring over said driven element shoulder being secured to said ratchet wheel, and a shiftable pawl for selectively rotating said ratchet wheel so as to unwind said clutch spring and thus free said driven element for rotation under the urging of said biasing spring to said starting position.

4. An interval timer comprising, in combination, a drive element having a cylindrical shoulder and being coupled to a timing train for rotation in one direction, a rotatable driven element having a cylindrical shoulder adjacent and axially alined with the shoulder of said drive element, a projection mounted for rotation with said drive element, a biasing spring coupled to said driven element for urging the driven element in the direction opposite said one direction so as to bring said projection against a stop to establish a starting position, a coil clutch spring wound closely about said shoulder so that rotation of said drive element in said one direction tends to tighten said spring and drive said driven element from said starting position, a collar loosely fitted on said clutch spring, the end of said clutch spring over said drive element shoulder being secured to said collar, a helical trip spring wound closely about said collar and having radially extending ends, an operator shiftably mounted for movement between On and Off positions, an abutment on said operator engageable, when the operator is in Off position, with one end of said trip spring so as to prevent unwinding of the trip spring and rotation of said collar in said one direction, said abutment being spaced from said trip spring end when the operator is in On position so that said collar is free to rotate with said clutch spring as said drive shaft drives said driven element, an elapsed time pointer mounted for rotation with said driven element, a ratchet wheel rotatably mounted adjacent said collar with the end of said clutch spring over said driven element shoulder being secured to said ratchet wheel, and a shiftable pawl for selectively rotating said ratchet wheel so as to unwind said clutch spring and thus free said driven element for rotation under the urging of said biasing spring to said starting position, one end of said trip spring being in the path of said projection as the driven element is rotated from said starting position so that said projection will engage the trip spring end and tighten the trip spring on the collar to thus interrupt the drive of said clutch spring.

5. An interval timer comprising, in combination, a drive element having a cylindrical shoulder and being coupled to a timing train for rotation in one direction, a rotatable driven element having a cylindrical shoulder adjacent and axially alined with the shoulder of said drive element, a projection mounted for rotation with said drive element, a biasing spring coupled to said driven element for urging the driven element in the direction opposite said one direction so as to bring said projection against a stop to establish a starting position, a coil clutch spring wound closely about said shoulder so that rotation of said drive element in said one direction tends to tighten said spring and drive said driven element from said starting position, a collar loosely fitted on said clutch spring, the end of said clutch spring over said drive element shoulder being secured to said collar, means coupling said operator to said collar so as to prevent rotation of the collar when the operator is in said Off position and to free the collar for rotation when the operator in in On position, an elapsed time pointer mounted for rotation with said driven element, a ratchet wheel rotatably mounted adjacent said collar with the end of said clutch spring over said driven element shoulder being secured to said ratchet wheel, a shiftable pawl for selectively rotating said ratchet wheel so as to unwind said clutch spring and thus free said driven element for rotation under the urging of said biasing spring to said starting position.

6. An interval timer comprising, in combination, a drive element having a cylindrical shoulder and being coupled to a timing train for rotation in one direction, a rotatable driven element having a cylindrical shoulder adjacent and axially alined with the shoulder of said drive element, a projection mounted for rotation with said drive element, a biasing spring coupled to said driven element for urging the driven element in the direction opposite said one direction so as to bring said projection against a stop to establish a starting position, a coil clutch spring wound closely about said shoulders so that rotation of said drive element in said one direction tends to tighten said spring and drive said driven element from said starting position, a collar loosely fitted on said clutch spring, the end of said clutch spring over said drive element shoulder being secured to said collar, a helical trip spring wound closely about said collar and having radially extending ends, an operator shiftably mounted for movement between On and Off positions, an abutment on said operator engageable, when the operator is in Off position, with one end of said trip spring so as to prevent unwinding of the trip spring and rotation of said collar in said one direction, said abutment being spaced from said trip spring end when the operator is in On position so that said collar is free to rotate with said clutch spring as said drive shaft drives said driven element, an elapsed time pointer mounted for rotation with said driven element, a ratchet wheel rotatably mounted adjacent said collar with the end of said clutch spring over said driven element shoulder being secured to said ratchet wheel, a shiftable pawl for selectively rotating said ratchet wheel so as to unwind said clutch spring and thus free said driven element for rotation under the urgnig of said biasing spring to said starting position, an over-centering device, a pair of push buttons selectively engageable with said device for tripping said device into one or the other of its positions, said device being coupled to said operator so as to move the operator between On and Off positions as the device is over centered by said push buttons, and a third push button coupled to said pawl so that operation of the third push button returns said driven element to said starting position.

7. An interval timer comprising, in combination, a drive element having a cylindrical shoulder and being coupled to a timing train for rotation in one direction, a rotatable driven element having a cylindrical shoulder adjacent and axially alined with the shoulder of said drive element, a projection mounted for rotation with said drive element, a biasing spring coupled to said driven element for urging the driven element in the direction opposite said one direction so as to bring said projection against a stop to establish a starting position, a coil clutch spring wound closely about said shoulders so that rotation of said drive element in said one direction tends to tighten said spring and drive said driven element from said starting position, a collar loosely fitted on said clutch spring, the end of said clutch spring over said drive element shoulder being secured to said collar, a helical trip spring wound closely about said collar and having radially extending ends, an operator shiftably mounted for movement between On and Off positions, an abutment on said operator engageable, when the operator is in Off position, with one end of said trip spring so as to prevent unwinding of the trip spring and rotation of said collar in said one direction, said abutment being spaced from said trip spring end when the operator is in On position so that said collar is free to rotate with said clutch spring as said drive shaft drives said driven element, an elapsed time pointer mounted for rotation with said driven element, a ratchet wheel rotatably mounted adjacent said collar with the end of said clutch spring over said driven element shoulder being secured to said ratchet wheel, a shiftable pawl for selectively rotating said ratchet wheel so as to unwind said clutch spring and thus free said driven element for rotation under the urging of said biasing spring to said starting position, one end of said trip spring being in the path of said projection as the driven element is rotated from said starting position so that said projection will engage the trip spring end and tighten the trip spring on the collar to thus interrupt the drive of said clutch spring, an On signal, means for operating said On signal when said operator is shifted to On position, a warning signal, and means secured to said driven element for operating said warning signal following rotation of said driven element beyond a selected distance from said starting position.

References Cited in the file of this patent

UNITED STATES PATENTS

| | | |
|---|---|---|
| 2,058,712 | Muir et al. | Oct. 27, 1936 |
| 2,115,280 | Perlman | Apr. 26, 1938 |
| 2,210,337 | Perlman | Aug. 6, 1940 |
| 2,233,756 | Uhl | Mar. 4, 1941 |
| 2,553,482 | Smith | May 15, 1951 |
| 2,821,283 | Cruse | Jan. 28, 1958 |

FOREIGN PATENTS

| | | |
|---|---|---|
| 338,407 | Switzerland | June 30, 1959 |